United States Patent
Watanabe et al.

(10) Patent No.: US 8,144,225 B2
(45) Date of Patent: Mar. 27, 2012

(54) AMPLIFICATION TYPE SOLID-STATE IMAGING DEVICE

(75) Inventors: Takashi Watanabe, Kyoto (JP); Takahiko Yoshimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 781 days.

(21) Appl. No.: 12/224,685

(22) PCT Filed: Jan. 30, 2007

(86) PCT No.: PCT/JP2007/051434
§ 371 (c)(1),
(2), (4) Date: Dec. 5, 2008

(87) PCT Pub. No.: WO2007/099727
PCT Pub. Date: Sep. 7, 2007

(65) Prior Publication Data
US 2009/0237539 A1 Sep. 24, 2009

(30) Foreign Application Priority Data
Mar. 3, 2006 (JP) .................... 2006-057829

(51) Int. Cl.
*H04N 3/14* (2006.01)
*H04N 5/335* (2011.01)
*H01L 27/00* (2006.01)

(52) U.S. Cl. ........ 348/301; 348/294; 348/300; 348/308; 250/208.1

(58) Field of Classification Search .................. 348/294, 348/300, 301, 308; 250/208.1
See application file for complete search history.

(56) References Cited

U.S. PATENT DOCUMENTS

| 6,795,121 B2 * | 9/2004 | Matsunaga et al. .......... 348/308 |
| 2002/0000508 A1 | 1/2002 | Muramatsu et al. |
| 2002/0051229 A1 | 5/2002 | Eguchi et al. |

(Continued)

FOREIGN PATENT DOCUMENTS

| JP | 2001-320630 | 11/2001 |
| JP | 2002-077737 | 3/2002 |
| JP | 2003-101004 | 4/2003 |

(Continued)

OTHER PUBLICATIONS

Mabuchi, Keiji et al. "FD-Driving CMOS Image Sensors with Low-Voltage Driving Technologies," The Institute of the Image Information and Television Engineers, Mar. 26, 2004, vol. 28, No. 23, pp. 35-38.

*Primary Examiner* — Scott J Sugarman
(74) *Attorney, Agent, or Firm* — David G. Conlin; Steven M. Jensen; Edwards Wildman Palmer LLP (57) ABSTRACT

Before a signal charge from a photodiode 1 is transferred to a signal charge accumulating portion 3 by a scanning circuit 20, a reset transistor 4 is turned on for a prescribed period to reset the voltage of the signal charge accumulating portion 3 in a state in which the voltage of a read signal line 7 is retained at a first voltage (Vg) by lowering the drain side voltage of an amplifying transistor 5. Subsequently, by raising the drain side voltage of the amplifying transistor 5 by a scanning circuit 20 to make the read signal line 7 have a second voltage (Vrst) higher than the first voltage (Vg), the voltage of the signal charge accumulating portion 3 is made higher than a voltage immediately after resetting. Then, the transfer transistor 2 is turned on to transfer the signal charge from the photodiode 1 to the signal charge accumulating portion 3.

11 Claims, 9 Drawing Sheets

U.S. PATENT DOCUMENTS

| | | | |
|---|---|---|---|
| 2005/0062867 A1* | 3/2005 | Mabuchi | 348/308 |
| 2005/0121519 A1 | 6/2005 | Shinohara | |
| 2005/0212937 A1* | 9/2005 | Koyama | 348/301 |
| 2006/0001755 A1 | 1/2006 | Sato et al. | |
| 2007/0024726 A1 | 2/2007 | Nomoto et al. | |

FOREIGN PATENT DOCUMENTS

| | | |
|---|---|---|
| JP | 2005-094240 | 4/2005 |
| JP | 2005-192191 | 7/2005 |
| JP | 2006-014344 | 1/2006 |
| JP | 2006-019343 | 1/2006 |

* cited by examiner

AMPLIFICATION TYPE SOLID-STATE IMAGING DEVICE

TECHNICAL FIELD

The present invention relates to amplification type solid-state imaging devices having an amplifier circuit in its pixel part and more particularly to an improvement in the performance of the amplification type solid-state imaging device.

BACKGROUND ART

In general, a popularized amplification type solid-state imaging device has a pixel part having an amplification function and a scanning circuit placed in the periphery of the pixel part, where data are read from the pixel part by the scanning circuit.

As one example of the amplification type solid-state imaging device, an APS (Active Pixel Sensor) type image sensor in which the pixel part is constructed of CMOS (complementary metal oxide semiconductor) advantageous for integration of the pixel part with a peripheral driving circuit and a signal processing circuit is known. Among the APS type image sensors, a four-transistor type capable of obtaining a high image quality is becoming mainstream in recent years.

Figure 8:
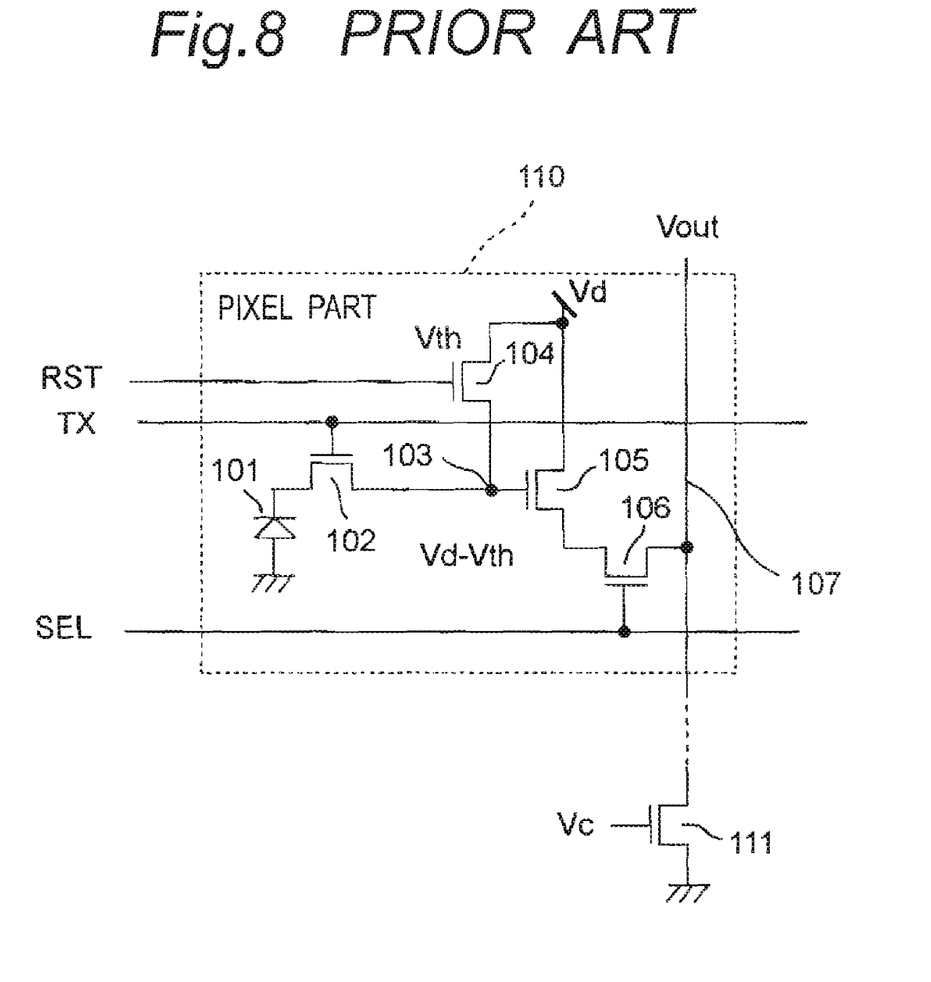
FIG. 8 is a circuit diagram showing the essential part of a conventional amplification type solid-state imaging device.

FIG. 8 is a diagram showing the pixel structure of a four-transistor type that has four MOS type transistors in a pixel part 110. In this case, a light-receiving portion 101 is usually constructed of an embedded photodiode, and a signal charge is transferred from the light-receiving portion 101 to a signal charge accumulating portion 103 (FD) by a transfer transistor 102. The signal charge accumulating portion 103 is reset with a power voltage Vd by a reset transistor 104 before the signal charge is transferred from the light-receiving portion 101. Subsequently, the transfer transistor 102 is turned on to transfer the signal charge. A voltage at the signal charge accumulating portion 103 after the resetting and after the signal charge transfer is amplified by an amplifying transistor 105, read to a read signal line 107 via a select transistor 106, received by a constant current load 111 connected to an end terminal and outputted to the subsequent stage.

In the pixel structure, during reset operation, the voltage VFD of the signal charge accumulating portion 103 becomes expressed by the following equation.

$$VFD = Vd - Vth \quad (1)$$

In this case, Vd is the drain voltage (power voltage) of the reset transistor 104, and Vth is the threshold voltage of the reset transistor 104. However, a backgating effect is produced because source voltage VFD>0, and the voltage becomes higher than a value Vth(0) when source voltage VFD=0. Therefore, according to Equation (1), the reset voltage generally becomes lower than the drain voltage.

In a case where the voltage of the signal charge accumulating portion 103 after the resetting is low, when the transfer transistor 102 is turned on to transfer the charge from the embedded photodiode 101 to the signal charge accumulating portion 103, a voltage difference between the two becomes insufficient, and complete transfer becomes difficult. That is, an electric charge remains in the photodiode 101, and a residual image occurs.

Figure 9:
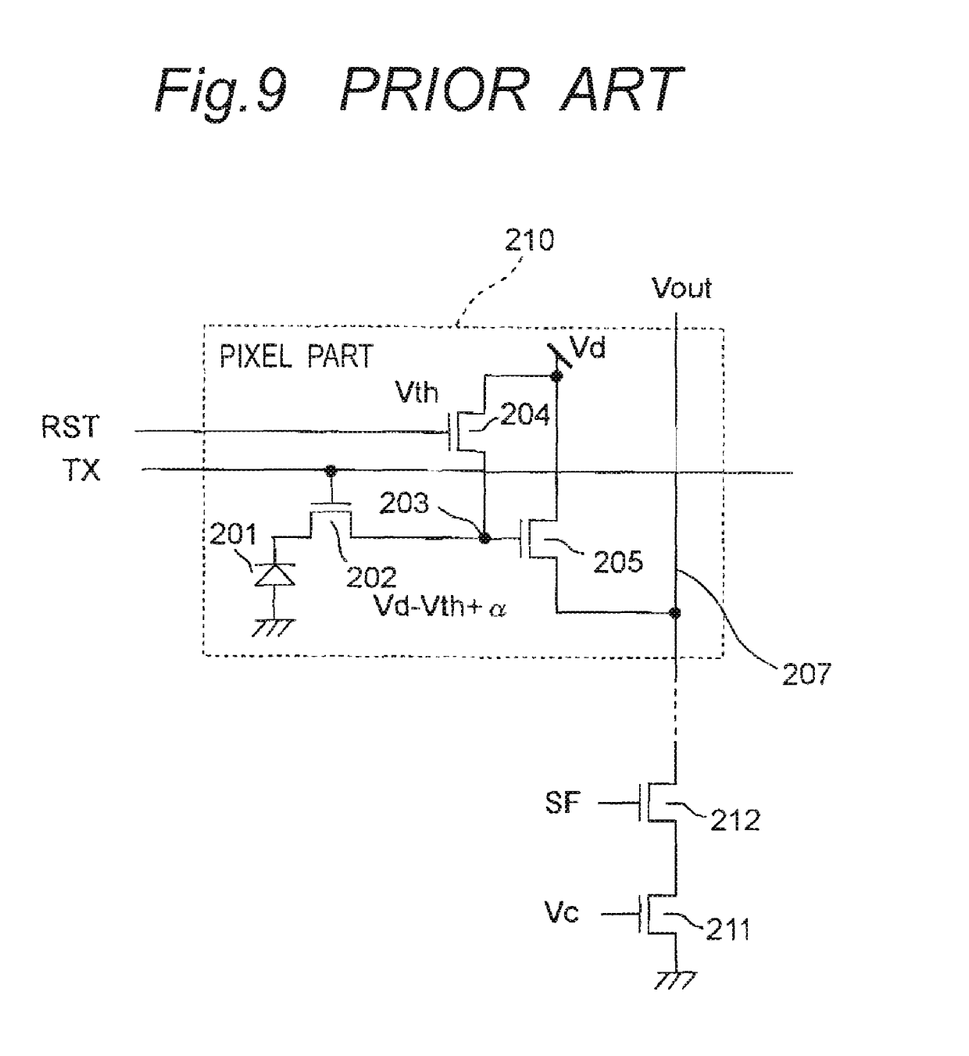
FIG. 9 is a circuit diagram showing the essential part of another conventional amplification type solid-state imaging device.

Accordingly, as a method for raising the voltage of the signal charge accumulating portion in the reset operation, the method of Document 1 (Keiji MABUCHI and seven others, "FD-Driving type CMOS sensor and its low-voltage drive technology" The Institute of Image Information and Television Engineers, Mar. 26, 2004, Vol. 28, No. 23, PP. 35-38) is proposed. FIG. 9 shows the pixel structure of the amplification type solid-state imaging device described in Document 1. FIG. 9 shows a light-receiving portion 201, a transfer transistor 202, a constant current load 211, and a switch transistor 212.

In FIG. 9, the source of the amplifying transistor 205 is connected not via the select transistor but directly to a read signal line 207. By turning on the reset transistor 204 in the reset operation, the voltage of the signal charge accumulating portion 203 rises first to (Vd−Vth) in a short time. Subsequently, the voltage of the read signal line 207 rises comparatively slowly and further rises by a due to a capacitance between the gate and the source of the amplifying transistor 205. That is, the voltage VFD of the signal charge accumulating portion 203 in this case becomes expressed by the following equation.

$$VFD = Vd - Vth + \alpha \quad (2)$$

However, the method of Document 1 has the following problem.

In the above Equation (2), the threshold voltage Vth of the reset transistor 204 becomes higher than Vth(0) due to the backgating effect and generally becomes about 0.8 V. On the other hand, the value of α depends on the capacitance between the gate and the source of the amplifying transistor 205 and the capacitance of the signal charge accumulating portion 203, and the value is about 0.4 V in the example of Document 1. Therefore, it is difficult for the value of the voltage VFD of the signal charge accumulating portion 203 to exceed the power voltage Vd.

Accordingly, the object of the invention is to provide an amplification type solid-state imaging device capable of sufficiently securing a voltage difference between a photoelectric transducer and a signal charge accumulating portion when a transfer transistor is turned on by increasing the voltage of the signal charge accumulating portion in the reset operation and easily achieving complete transfer (=no residual image) of a signal charge from the photoelectric transducer to the signal charge accumulating portion.

DISCLOSURE OF THE INVENTION

In order to achieve the above object, there is provided an amplification type solid-state imaging device comprising:

a pixel part having a photoelectric transducer, a transfer transistor to transfer a signal charge from the photoelectric transducer to a signal charge accumulating portion, a reset transistor to reset a voltage of the signal charge accumulating portion and an amplifying transistor whose source side is connected directly to a read signal line and amplifies and reads the voltage of the signal charge accumulating portion;

a control section that controls the transfer transistor and the reset transistor and controls a drain side voltage of the amplifying transistor, wherein the control section resets the voltage of the signal charge accumulating portion by turning on the reset transistor for a prescribed period in a state in which the voltage of the read signal line is retained at a first voltage by making a drain side voltage of the amplifying transistor have a low voltage out of a high voltage and the low voltage before a signal charge from the photoelectric transducer is transferred to the signal charge accumulating portion and thereafter making the drain side voltage of the amplifying transistor have the high voltage to make the read signal line have a second voltage higher than the first voltage, whereby the voltage of the signal charge accumulating portion becomes higher than a voltage immediately after resetting.

According to the above construction, by lowering the drain side voltage of the amplifying transistor by the control section before resetting, the source side of the amplifying transistor connected directly to the read signal line can be made to have a first voltage in a low state. Subsequently, by turning on the reset transistor for a prescribed period to reset the voltage of the signal charge accumulating portion and thereafter raising the drain side voltage of the amplifying transistor to make the drain side of the amplifying transistor have a high voltage, the read signal line can be made to have a second voltage higher than the first voltage. By so doing, the voltage of the signal charge accumulating portion is made higher than the voltage immediately after the resetting via the capacitance between the input side and the output side (read signal line side) of the amplifying transistor. If the transfer transistor is turned on in this state, it becomes possible to sufficiently secure a voltage difference between the photoelectric transducer and the signal charge accumulating portion (FD) and to easily achieve complete transfer, and this enables the achievement of no residual image. Moreover, by expanding the voltage margins of the photoelectric transducer and the signal charge accumulating portion, the pixel performance can be improved with an increase in the maximum amount of signals to be handled.

In one embodiment of the invention, the amplification type solid-state imaging device further comprises:

a select transistor inserted between the drain side of the amplifying transistor and a high voltage power source side, the select transistor being controlled by the control section.

According to the above embodiment, by turning off the select transistor with respect to the high voltage power source by the control section before resetting to lower the drain side voltage of the amplifying transistor, the source side of the amplifying transistor connected directly to the read signal line can be made to have the first voltage in the low state. Subsequently, by turning on the reset transistor by the control section for a prescribed period to reset the voltage of the signal charge accumulating portion and thereafter making the select transistor have a high voltage to raise the drain side voltage of the amplifying transistor and to make the drain side of the amplifying transistor have the voltage of the high voltage power source, the read signal line can be made to have a second voltage higher than the first voltage.

In one embodiment of the invention, the drain side of the amplifying transistor is connected to a drain signal line, and a voltage of the drain signal line is controlled by the control section.

According to the above embodiment, by lowering the voltage of the drain signal line by the control section before resetting to lower the drain side voltage of the amplifying transistor, the source side of the amplifying transistor connected directly to the read signal line can be made to have the first voltage in the low state. Subsequently, by turning on the reset transistor for a prescribed period by the control section to reset the voltage of the signal charge accumulating section and thereafter raising the voltage of the drain signal line to raise the drain side voltage of the amplifying transistor, the read signal line can be made to have the second voltage higher than the first voltage.

In one embodiment of the invention, the control section makes the drain side of the amplifying transistor have the high voltage to make the read signal line have the second voltage and thereafter turns on the transfer transistor in order to transfer the signal charge from the photoelectric transducer to the signal charge accumulating portion.

According to the above embodiment, by raising the drain side voltage of the amplifying transistor by the control section to make the read signal line have the second voltage and thereafter turning on the transfer transistor to transfer the signal charge from the photoelectric transducer to the signal charge accumulating portion, the charge transfer from the photoelectric transducer to the signal charge accumulating portion can be made complete.

In one embodiment of the invention, the amplification type solid-state imaging device further comprises:

a load connected between the read signal line and a low voltage power source side.

According to the above embodiment, the read signal line is connected to the low voltage power source side via the load, and therefore, a read signal corresponding to the voltage of the signal charge accumulating portion amplified by the amplifying transistor is outputted to the read signal line.

In one embodiment of the invention, the control section brings the select transistor into an off state when turning on the reset transistor to make the drain side of the amplifying transistor have the low voltage and to make the read signal line have the first voltage and thereafter turns on the select transistor to make the drain side of the amplifying transistor have the high voltage, thereby making the read signal line have the second voltage.

According to the above embodiment, by bringing the drain side of the amplifying transistor into the off state with respect to the high voltage power source before resetting to bring the source side voltage of the amplifying transistor connected to the read signal line into the low state and to enable the read signal line to have the first voltage and bringing the drain side of the amplifying transistor into the on state with respect to the high voltage power source after resetting, the read signal line can be made to have a voltage higher than the first voltage.

In one embodiment of the invention, the control section makes the drain signal line have the low voltage out of the high voltage and the low voltage when turning on the reset transistor to make the read signal line have the first voltage and thereafter makes the drain signal line have the high voltage, thereby making the read signal line have the second voltage.

According to the above embodiment, by lowering the voltage of the drain signal line before resetting to bring the source side voltage of the amplifying transistor connected to the read signal line into the low state and to enable the read signal line to have the first voltage and raising the voltage of the drain signal line after resetting to make the drain side of the amplifying transistor have a high voltage, the read signal line can be made to have a voltage higher than the first voltage.

In one embodiment of the invention, a capacitance element is inserted between the signal charge accumulating portion and the read signal line.

According to the above embodiment, the capacitance between the input side and the output side (on the read signal line side) of the amplifying transistor increases because of the capacitance due to the capacitance element added to the capacitance between the gate and the source of the amplifying transistor. The effect of raising the voltage of the signal charge accumulating portion from the voltage at the time of resetting is increased when the voltage of the read signal line rises. This therefore further facilitates the completing (=no residual image) of the charge transfer from the photoelectric transducer to the signal charge accumulating portion.

In one embodiment of the invention, the reset transistor is a depletion type MOS type transistor.

According to the above embodiment, by employing the depletion type MOS type transistor for the reset transistor, the voltage of the signal charge accumulating portion can be raised up to the power voltage when the signal charge accumulating portion is reset by the low first voltage of the read signal line. Therefore, when the read signal line is subsequently made to have the second voltage higher than the first voltage, the voltage of the signal charge accumulating portion can be raised up to a value higher than the power voltage. This therefore becomes more advantageous for the completing (=no residual image) of the charge transfer from the photoelectric transducer to the signal charge accumulating portion.

In one embodiment of the invention, the select transistor is a depletion type MOS type transistor.

According to the above embodiment, by employing the depletion type MOS type transistor for the select transistor, the amplifying transistor can be switched by the select transistor over the entire range of the output voltage of the amplifying transistor with the amplifying function sufficiently exerted so long as the amplifying transistor is of the enhancement type even if the voltage of the signal charge accumulating portion is raised to a value higher than the power voltage.

In one embodiment of the invention, the amplification type solid-state imaging device further comprises:

a switch transistor provided between the read signal line and the load.

According to the above embodiment, in the case where the select transistor is a depletion type MOS type transistor and the switch transistor is absent, a leakage current occurs via the load between the high voltage power source side and the low voltage power source side even in the non-selected state of the select transistor the gate voltage of which is zero. According to the amplification type solid-state imaging device of the embodiment, the leakage current flowing via the load can be suppressed by turning off the switch transistor in the non-selected state of the select transistor.

In one embodiment of the invention, the photoelectric transducer is an embedded type photodiode.

According to the above embodiment, the embedded type photodiode is completely depleted during the charge transfer from the photoelectric transducer to the signal charge accumulating portion, and this facilitates the completing of the transfer and allows a high-quality image to be obtained.

As is apparent from the above, the amplification type solid-state imaging device of the invention can make the voltage of the signal charge accumulating portion higher than the power voltage in the reset operation and easily achieve complete transfer (=no residual image) of the signal charge from the photoelectric transducer to the signal charge accumulating portion by sufficiently securing the voltage difference between the embedded photodiode and the signal charge accumulating portion (FD) when the transfer transistor is turned on.

DETAILED DESCRIPTION OF THE INVENTION

The amplification type solid-state imaging device of the invention is described in detail below by the embodiments shown in the drawings.

(First Embodiment)

Figure 1:
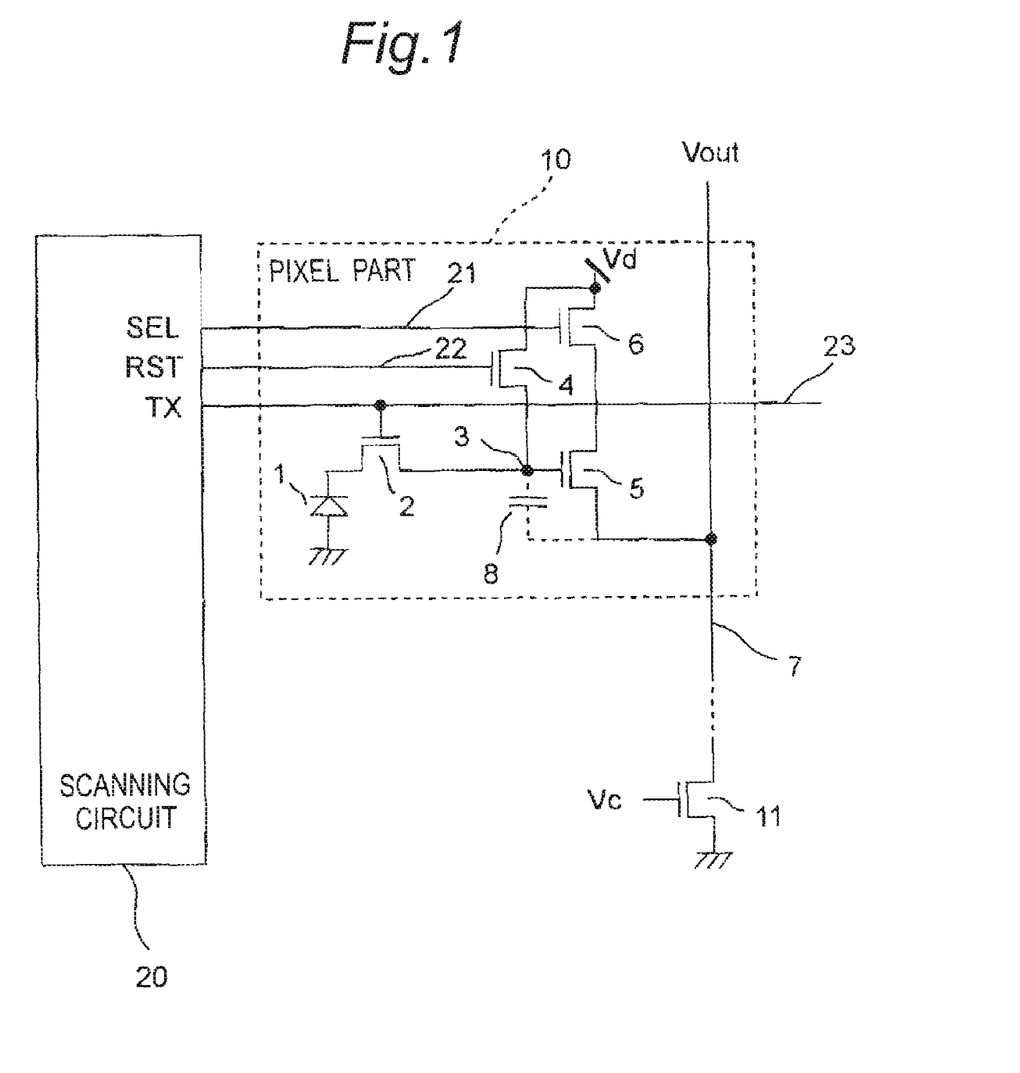
FIG. 1 is a circuit diagram showing the essential part of an amplification type solid-state imaging device according to a first embodiment of the invention.

FIG. 1 is a circuit diagram showing the essential part of the amplification type solid-state imaging device of the first embodiment of the invention. The amplification type solid-state imaging device of the first embodiment has a plurality of pixel parts 10 arranged in a matrix form and a scanning circuit 20 as one example of the control section to control the pixel parts 10. In FIG. 1, only one pixel part 10 is shown. The pixel part 10 and the scanning circuit 20 are formed on a semiconductor substrate (not shown).

The pixel part 10 has an embedded type photodiode 1 as one example of the photoelectric transducer, a transfer transistor 2 that transfers a signal charge from the photodiode 1, a signal charge accumulating portion 3 that accumulates the signal charge of the photodiode 1 transferred from the transfer transistor 2, a reset transistor 4 that resets the voltage of the signal charge accumulating portion 3, an amplifying transistor 5 that amplifies and reads the voltage of the signal charge accumulating portion 3, and a select transistor 6 inserted between the amplifying transistor 5 and a power voltages Vd on the high voltage power source side.

The voltage of the signal charge accumulating portion 3 amplified by the amplifying transistor 5 is outputted to a read signal line 7 connected directly to the output side of the amplifying transistor 5. The anode of the photodiode 1 is connected to the ground, and the cathode of the photodiode 1 is connected to one terminal of the transfer transistor 2. The other terminal of the transfer transistor 2 is connected to the signal charge accumulating portion 3, and a transfer control signal line 23 is connected to the gate of the transfer transistor 2. The source of the reset transistor 4 is connected to the signal charge accumulating portion 3, and the drain of the reset transistor 4 is connected to the power voltage Vd located on the high voltage power source side. A reset signal line 22 is connected to the gate of the reset transistor 4. Moreover, the gate of the amplifying transistor 5 is connected to the signal charge accumulating portion 3, and the source of the amplifying transistor 5 is connected to the read signal line 7. Moreover, the source of the select transistor 6 is connected to the drain of the amplifying transistor 5, and the power voltage Vd is applied to the drain of the select transistor 6. A select control signal line 21 is connected to the gate of the select transistor 6.

A constant current load 11 is connected between one terminal of the read signal line 7 and the ground located on the low voltage power source side. The constant current load 11 is an enhancement type MOS transistor to the base of which a bias voltage Vc is applied.

The reset transistor 4, the transfer transistor 2, the amplifying transistor 5 and the select transistor 6 are enhancement type MOS transistors. Moreover, the signal charge accumulating portion 3 is a floating diffusion region formed on a semiconductor substrate (not shown).

Moreover, the scanning circuit 20 outputs a select control signal SEL, a reset signal RST and a transfer control signal TX. The select control signal SEL is inputted to the gate of the select transistor 6 via the select control signal line 21. Moreover, the reset signal RST is inputted to the gate of the reset transistor 4 via the reset signal line 22. Moreover, the transfer control signal TX is inputted to the gate of the transfer transistor 2 via the transfer control signal line 23.

In this case, the pixel part 10 differs from the construction of the conventional amplification type solid-state imaging device shown in FIG. 8 in that the select transistor 6 is connected to the high voltage power source side (Vd) of the amplifying transistor 5. Moreover, a capacitance 8 may be added between the signal charge accumulating portion 3 (FD) and the read signal line 7.

Figure 2:
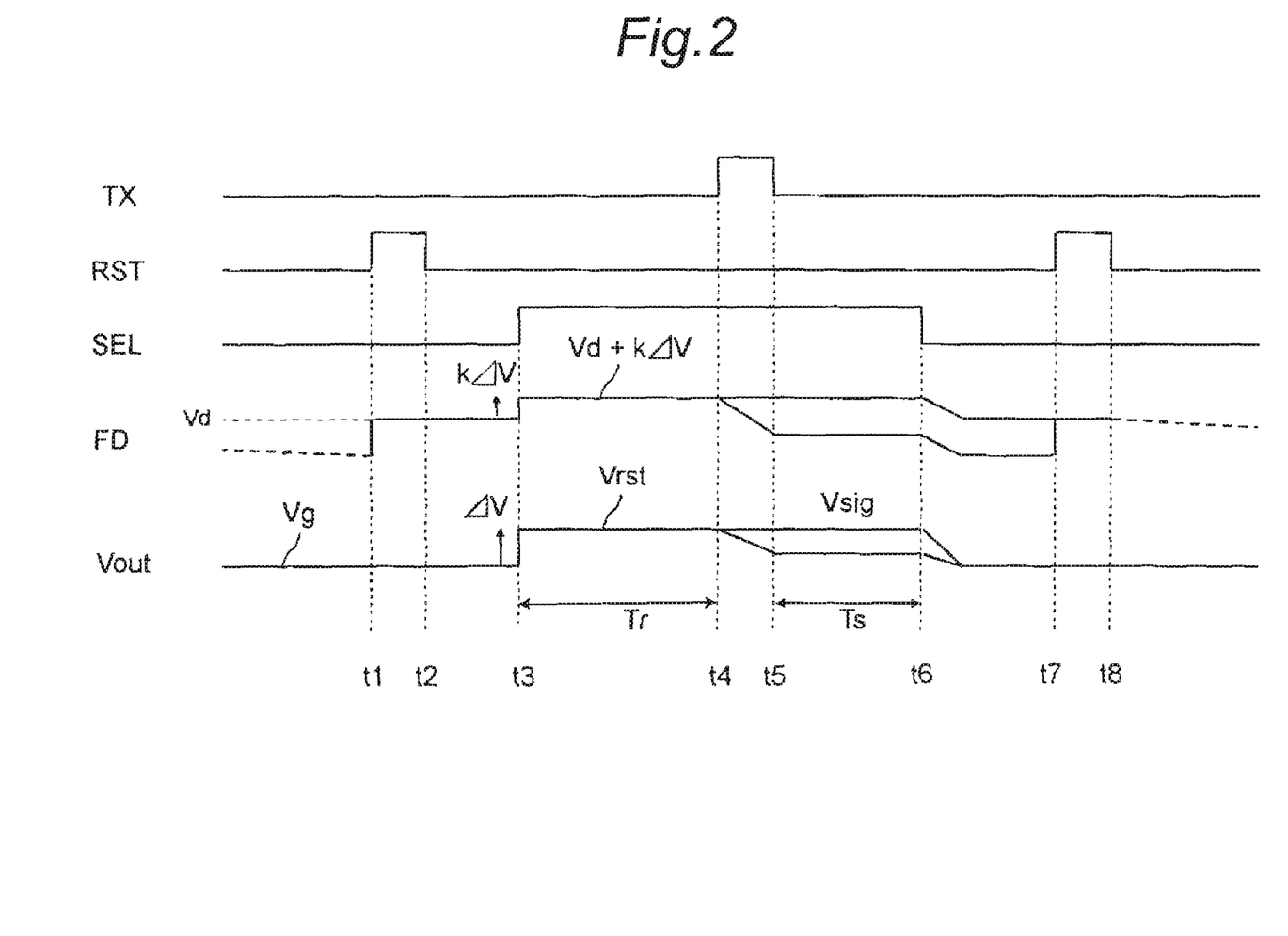
FIG. 2 is a timing chart, of the amplification type solid-state imaging device of which the construction is shown in FIG. 1.

FIG. 2 shows the timing of the drive pulses of the amplification type solid-state imaging device shown in FIG. 1.

First of all, the reset signal RST goes high level from low level at time t1 to turn on the reset transistor 4, and the voltage of the signal charge accumulating portion 3 is raised close to the power voltage Vd.

Next, even when the reset signal RST goes low level from high level at time t2 to turn off the reset transistor 4, the voltage of the signal charge accumulating portion 3 is retained.

Moreover, since the select transistor 6 is in the off state due to the select control signal SEL at low level before time t3, the voltage Vout of the read signal line 7 is retained at a voltage Vg close to the ground voltage (GND) as one example of the first voltage.

Next, the select control signal SEL goes high level from low level at time t3 to turn on the select transistor 6, and therefore, the voltage Vout of the read signal line 7 is raised by ΔV to a reset level Vrst as one example of the second voltage. In accordance with this, the voltage of the signal charge accumulating portion 3 is raised by kΔV. The value of k is expressed by the following equation.

$$k=(Cgs+C8)/(Cfd+Cgs+C8) \quad (3)$$

where

Cfd: capacitance of the entire signal charge accumulating portion 3,

Cgs: capacitance between the gate and the source of the amplifying transistor 5, and C8: capacitance of the capacitance 8.

When the capacitance 8 is absent, C8=0.

In this operation, the amplifying transistor 5 has a high gate voltage close to the power voltage Vd immediately before time t3, and the amplifying transistor 5 has a low source voltage close to the ground voltage (GND). Accordingly, there is a state in which the channel of the amplifying transistor 5 is formed, and Cgs is almost the capacitance of the entire gate of the amplifying transistor 5. Therefore, the value of k can be sufficiently secured even in the absence of the capacitance 8, and the value of k can be further increased in the presence of the capacitance 8. The capacitance 8 may be formed by devising the layout of a capacitance between wiring lines or the like.

In a period Tr in which the voltage of the signal charge accumulating portion 3 becomes higher than the power voltage Vd, the reset level Vrst of the read signal line 7 is read. Subsequently, if the transfer transistor 2 is turned on at time t4, a voltage difference between the embedded type photodiode 1 and the signal charge accumulating portion 3 can be sufficiently secured, and this can facilitate the complete transfer (=no residual image).

Subsequently, when the transfer transistor 2 is closed at time t5, the voltage of the signal charge accumulating portion 3 changes in accordance with the quantity of charge, and the output signal changes in correspondence with it. Therefore, the signal level Vsig of the read signal line 7 is read in a period Ts (t5 to t6).

According to the amplification type solid-state imaging device of the above construction, by turning off the transfer transistor 2, the reset transistor 4 and the select transistor 6 to bring the drain side of the amplifying transistor 5 into the off state with respect to the high voltage power source before resetting, the source side of the amplifying transistor 5 connected to the read signal line 7 can be made to have the first voltage (voltage Vg) of low voltage state. Moreover, subsequently, by turning on the reset transistor 4 for a prescribed period (t1 to t2) to reset the voltage of the signal charge accumulating portion 3 and thereafter turning on the select transistor 6 to bring the drain side of the amplifying transistor 5 into the on state with respect to the high voltage power source side, the read signal line 7 can be made to have the second voltage (reset level Vrst) higher than the first voltage. By so doing, the voltage of the signal charge accumulating portion 3 is made higher than the first voltage (voltage Vg) immediately after resetting via the capacitance between the input side and the output side (read signal line 7 side) of the amplifying transistor 5. If the transfer transistor 2 is turned on in this state, it becomes possible to sufficiently secure the voltage difference between the photodiode 1 and the signal charge accumulating portion 3 and to facilitate the complete transfer, by which no residual image can be achieved. Moreover, by expanding the voltage margins of the photodiode 1 and the signal charge accumulating portion 3, the maximum amount of signals to be handled is increased, and the pixel performance can be improved.

Moreover, by turning on the select transistor 6 to make the read signal line 7 have the second voltage (reset level Vrst) and thereafter turning on the transfer transistor 2 to transfer the signal charge from the photodiode 1 to the signal charge accumulating portion 3 by the control section, the charge transfer from the photodiode 1 to the signal charge accumulating portion 3 can be made complete.

Moreover, since the read signal line 7 is connected to the low voltage power source side via the constant current load 11, a read signal corresponding to the voltage of the signal charge accumulating portion 3 amplified by the amplifying transistor 5 is outputted to the read signal line 7.

Moreover, the capacitance between the input side and the output side (on the read signal line 7 side) of the amplifying transistor 5 increases because of the added capacitance due to the capacitance 8 in addition to the capacitance between the gate and the source of the amplifying transistor 5. The effect of raising the voltage of the signal charge accumulating portion 3 from the voltage at the time of resetting is increased when the voltage of the read signal line 7 rises. This therefore further facilitates the completing (=no residual image) of the charge transfer from the photodiode 1 to the signal charge accumulating portion 3.

Moreover, employing the embedded type photodiode 1 facilitates the completing of the charge transfer from the photodiode 1 to the signal charge accumulating portion 3 and makes it possible to reduce a dark current generated in the photodiode 1, allowing a high-quality image to be obtained.

(Second Embodiment)

Figure 3:
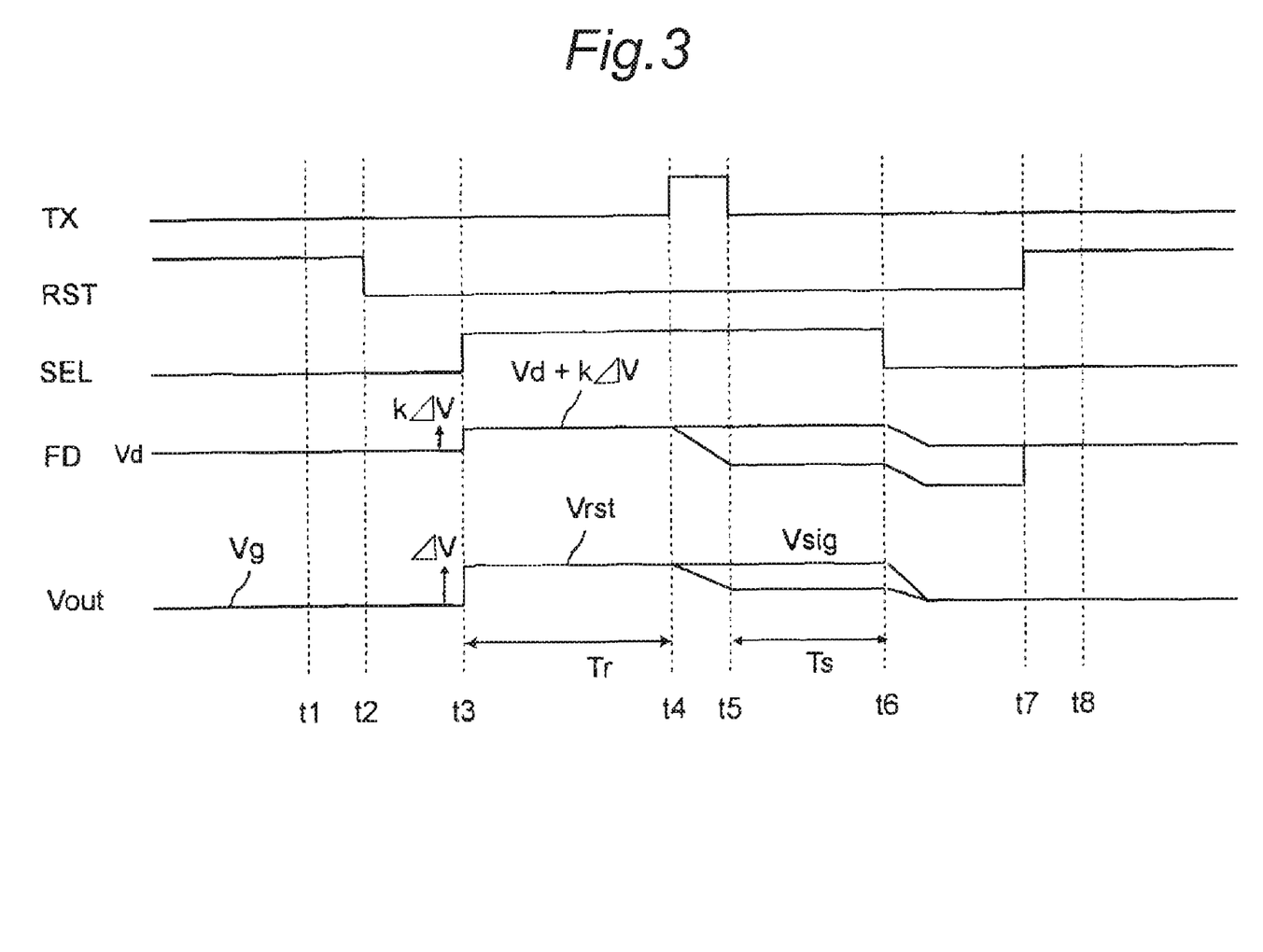
FIG. 3 is another timing chart of the amplification type solid-state imaging device of which the construction is shown in FIG. 1 according to a second embodiment of the invention.

FIG. 3 is a timing chart showing the essential part of an amplification type solid-state imaging device according to a second embodiment of the invention. In this case, the circuit diagram of the objective pixel part is the same as that of the pixel part of the amplification type solid-state imaging device of the first embodiment shown in FIG. 1.

The amplification type solid-state imaging device of the second embodiment has a timing different from the timing chart shown in FIG. 2 of the first embodiment in the point that the reset signal RST is fixed to high level until time t2 and after time t7, i.e., the point that the low level is only in the period of t2 to t7. In FIG. 3, the period of t1 to t8 is that same as in FIG. 2, and therefore, the operation in the period is the same as in FIG. 2. Further, in the case of FIG. 3, the reset transistor 4 is consistently on until time t1 and after time t8 in a non-read period, and therefore, the voltage of the signal charge accumulating portion 3 (FD) is fixed to the power voltage Vd. Therefore, an excessive signal charge generated in the photodiode 1 first flows into the signal charge accumulating portion 3 (FD) via the transfer transistor 2 when an excessive incident light is on the photodiode 1. However, the voltage of the signal charge accumulating portion 3 (FD) is fixed to the power voltage Vd as described above, and therefore, the charge is promptly discharged to the power voltage Vd, producing the effect of preventing the blooming phenomenon that the excessive signal charge overflows to the peripheries without being discharged.

(Third Embodiment)

Figure 4:
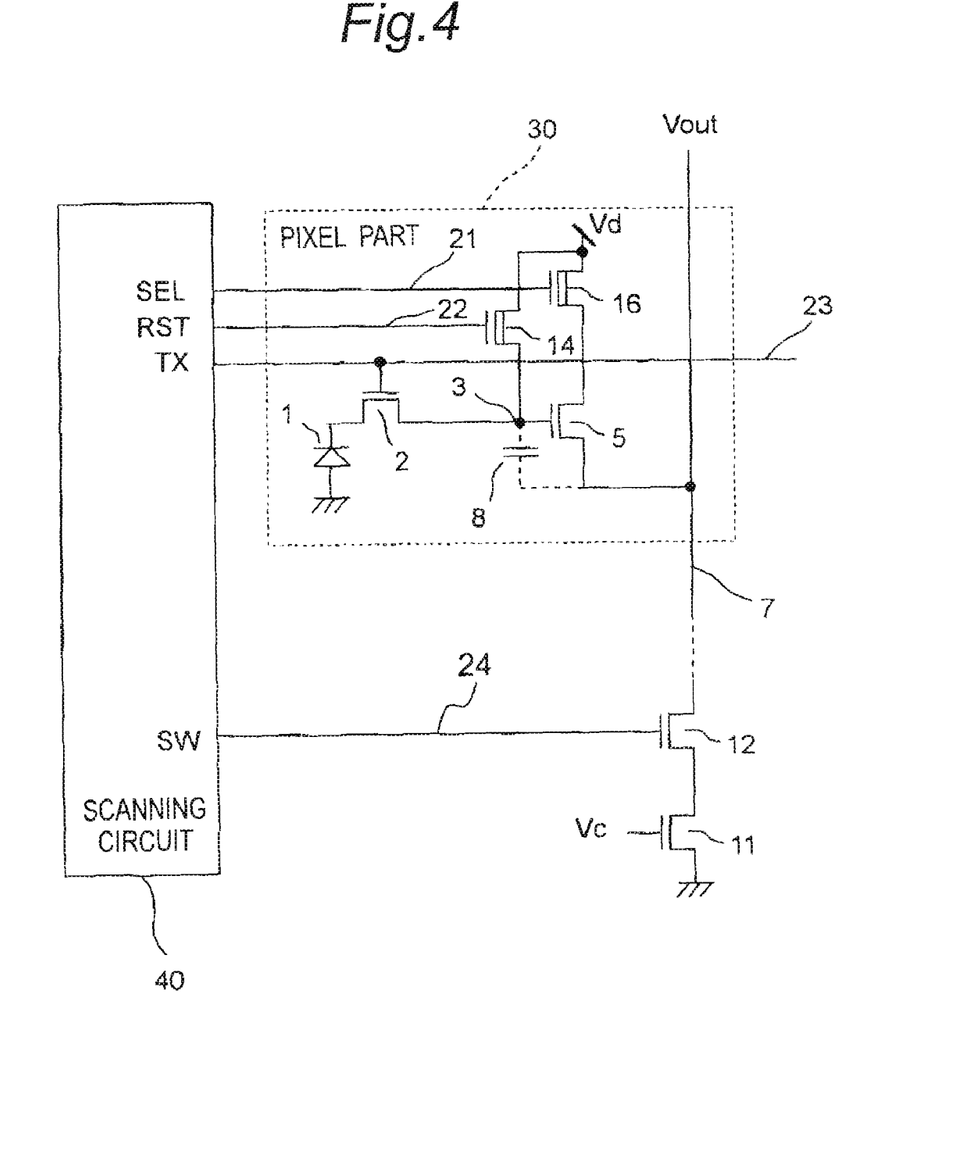
FIG. 4 is a circuit diagram showing the essential part of an amplification type solid-state imaging device according to a third embodiment of the invention.

FIG. 4 is a circuit diagram showing the essential part of an amplification type solid-state imaging device according to the third embodiment of the invention. The amplification type solid-state imaging device of the third embodiment has the same construction as that of the amplification type solid-state imaging device of the first embodiment except that the reset transistor 14 and the select transistor 16 are depletion type MOS type transistors, a switch transistor 12 is provided between the read signal line 7 and the constant current load 11 and except a scanning circuit 40.

As shown in FIG. 4, the amplification type solid-state imaging device of the third embodiment has a plurality of pixel parts 30 arranged in a matrix form and the scanning circuit 40 as one example of the control section to control the pixel parts 30. In FIG. 4, only one pixel part 30 is shown. The pixel parts 30 and the scanning circuit 40 are formed on a semiconductor substrate (not shown).

The pixel part 30 has an embedded type photodiode 1 as one example of the photoelectric transducer, a transfer transistor 2 that transfers a signal charge from the photodiode 1, a signal charge accumulating portion 3 that accumulates the signal charge of the photodiode 1 transferred from the transfer transistor 2, a reset transistor 14 that resets the voltage of the signal charge accumulating portion 3, an amplifying transistor 5 that amplifies and reads the voltage of the signal charge accumulating portion 3, and a select transistor 16 inserted between the amplifying transistor 5 and the high voltage power source side.

The voltage of the signal charge accumulating portion 3 amplified by the amplifying transistor 5 is outputted to the read signal line 7 connected directly to the output side of the amplifying transistor 5. The anode of the photodiode 1 is connected to the ground, and the cathode of the photodiode 1 is connected to one terminal of the transfer transistor 2. The other terminal of the transfer transistor 2 is connected to the signal charge accumulating portion 3, and a transfer control signal line 23 is connected to the gate of the transfer transistor 2. The source of the reset transistor 14 is connected to the signal charge accumulating portion 3, and the drain of the reset transistor 14 is connected to the power voltage Vd. The reset signal line 22 is connected to the gate of the reset transistor 14. Moreover, the gate of the amplifying transistor 5 is connected to the signal charge accumulating portion 3, and the source of the amplifying transistor 5 is connected to the read signal line 7. Moreover, the power voltage Vd is applied to the drain of the select transistor 16.

The switch transistor 12 and the constant current load 11 are connected between one terminal of the read signal line 7 and the ground. The constant current load 11 is an enhancement type MOS transistor to the base of which a bias voltage Vc is applied.

The transfer transistor 2 and the amplifying transistor 5 are enhancement type MOS transistors, and the reset transistor 14 and the select transistor 16 are depletion type MOS type transistors. Moreover, the signal charge accumulating portion 3 is a floating diffusion region formed on a semiconductor substrate (not shown).

Moreover, the scanning circuit 40 outputs a select control signal SEL, a reset signal RST, a transfer control signal TX and a switch control signal SW. The select control signal SEL is inputted to the gate of the select transistor 16 via the select control signal line 21. Moreover, the reset signal RST is inputted to the gate of the reset transistor 14 via the reset signal line 22. Moreover, the transfer control signal TX is inputted to the gate of the transfer transistor 2 via the transfer control signal line 23. Further, the switch control signal SW is inputted via the switch control signal line 24 of the switch transistor 12.

Figure 5:
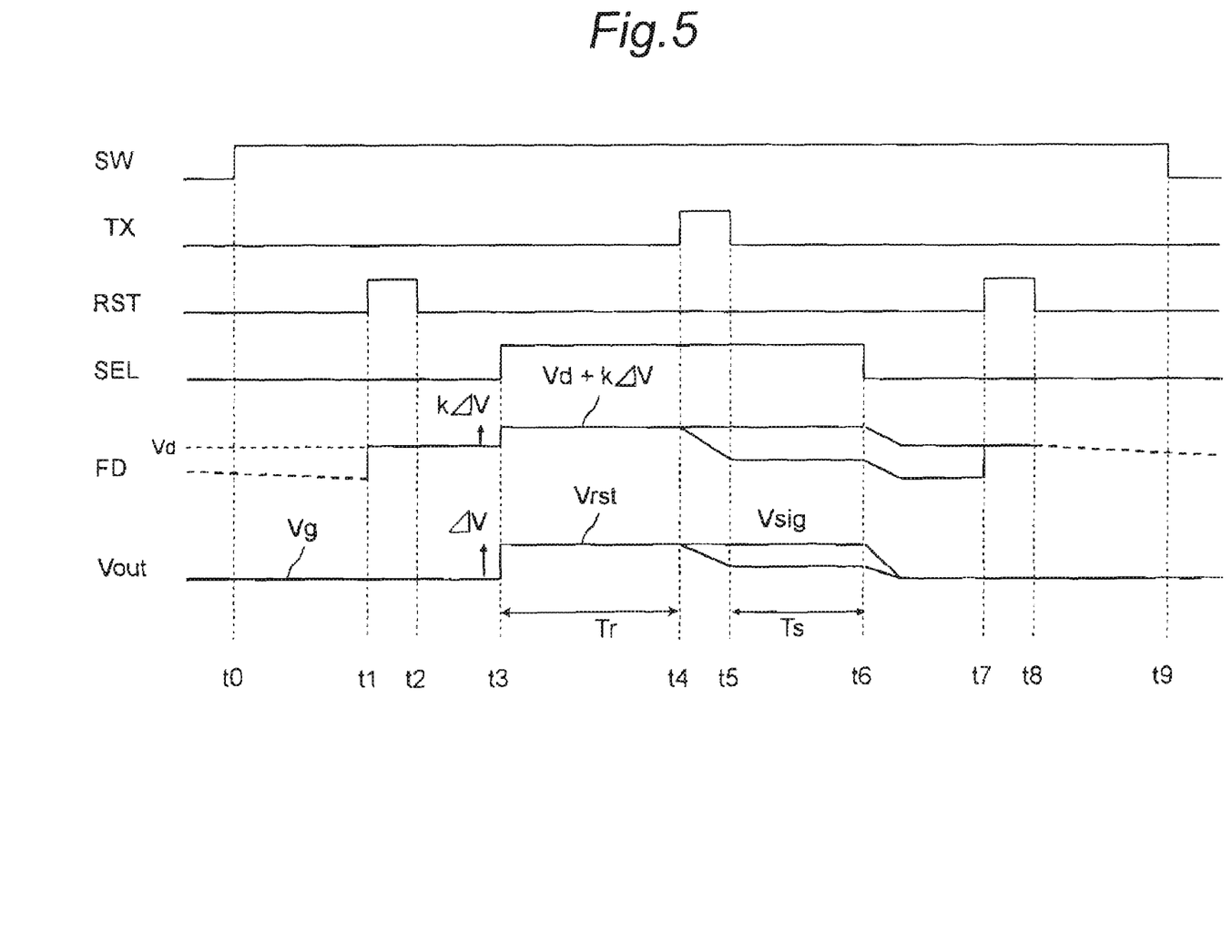
FIG. 5 is a timing chart of the amplification type solid-state imaging device of which the construction is shown in FIG. 4.

FIG. 5 shows the timing of the drive pulses of the amplification type solid-state imaging device shown in FIG. 4.

First of all, the switch control signal SW is made to have low level before time t0 and after time t9 to turn off the switch transistor 12. At this time, even if the select transistor 16 of a depletion type turns on with its gate voltage being zero, no leakage current flows via the constant current load 11 between the high voltage power source side and the low voltage power source side because the switch transistor 12 is off.

At time t0, with the select transistor 16 being on but not sufficiently on, the switch control signal SW goes high level from low level to turn on the switch transistor 12, by which the voltage Vout of the read signal line 7 becomes a low voltage Vg close to the ground voltage (GND).

Next, at time t1, the reset signal RST goes high level from low level, i.e., 0 volt to sufficiently turn on the reset transistor 14. Since the reset transistor 14 is of the depletion type in this case, the voltage of the signal charge accumulating portion 3 is raised up to the power voltage Vd.

Next, at time t3, the select control signal SEL goes high level from low level, i.e., 0 volt to sufficiently turn on the select transistor 16 of the depletion type, and thus the amplifying transistor 5 exerts sufficient amplifying function, so that the voltage Vout of the read signal line 7 is raised by ΔV to the reset level Vrst. In accordance with this, the voltage of the signal charge accumulating portion 3 is raised by kΔV from the power voltage Vd.

Since the amplifying transistor 5 is of the enhancement type and the gate voltage thereof becomes higher than the power voltage. If the select transistor 16 is of the enhancement type, the select transistor 16 does not sufficiently turn on even when the gate voltage is raised to the power source voltage. In contrast to this, the amplification type solid-state imaging device of the third embodiment employs the depletion type MOS type transistor for the select transistor 16, and therefore, the select transistor 16 turns on sufficiently so that the amplifying transistor 15 exerts sufficient amplifying function even when the gate input of the amplifying transistor 5 is higher than the power voltage Vd.

Moreover, by employing the depletion type MOS type transistor for the reset transistor 14, the voltage of the signal charge accumulating portion 3 can be raised up to the power voltage when the signal charge accumulating portion 3 is reset by the first voltage (voltage Vg) of the low potential of the read signal line 7. Therefore, if the read signal line 7 is subsequently made to have the second voltage (reset level Vrst) higher than the first voltage (voltage Vg), the voltage of the signal charge accumulating portion 3 can be raised to a value higher than the power voltage. This therefore becomes more advantageous for the completing (=no residual image) of the charge transfer from the embedded photodiode 1 to the signal charge accumulating portion 3.

Moreover, by employing the depletion type MOS type transistor for the select transistor 16, the amplifying transistor 5, as far as it is of the enhancement type, can be switched by the select transistor 16 over the entire range of the output voltage with the amplifying function sufficiently exerted even when the voltage of the signal charge accumulating portion 3 is raised to a value higher than the power voltage.

Moreover, by virtue of the switch transistor 12 provided between the read signal line 7 and the constant current load 11, a leakage current that flows via the constant current load 11 can be suppressed by turning off the switch transistor 12 in the non-selected state of the depletion type select transistor 16.

(Fourth Embodiment)

Figure 6:
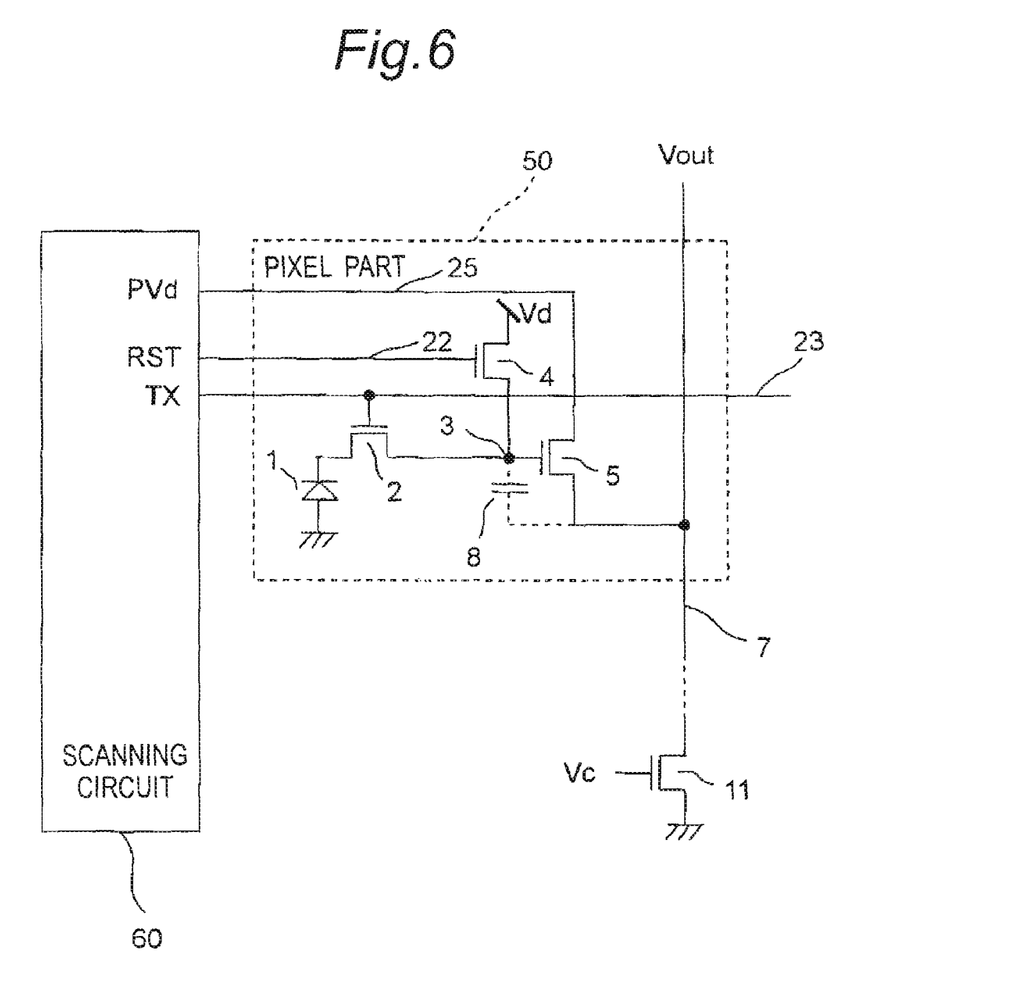
FIG. 6 is a circuit diagram showing the essential part of an amplification type solid-state imaging device according to a fourth embodiment of the invention.
Figure 7:
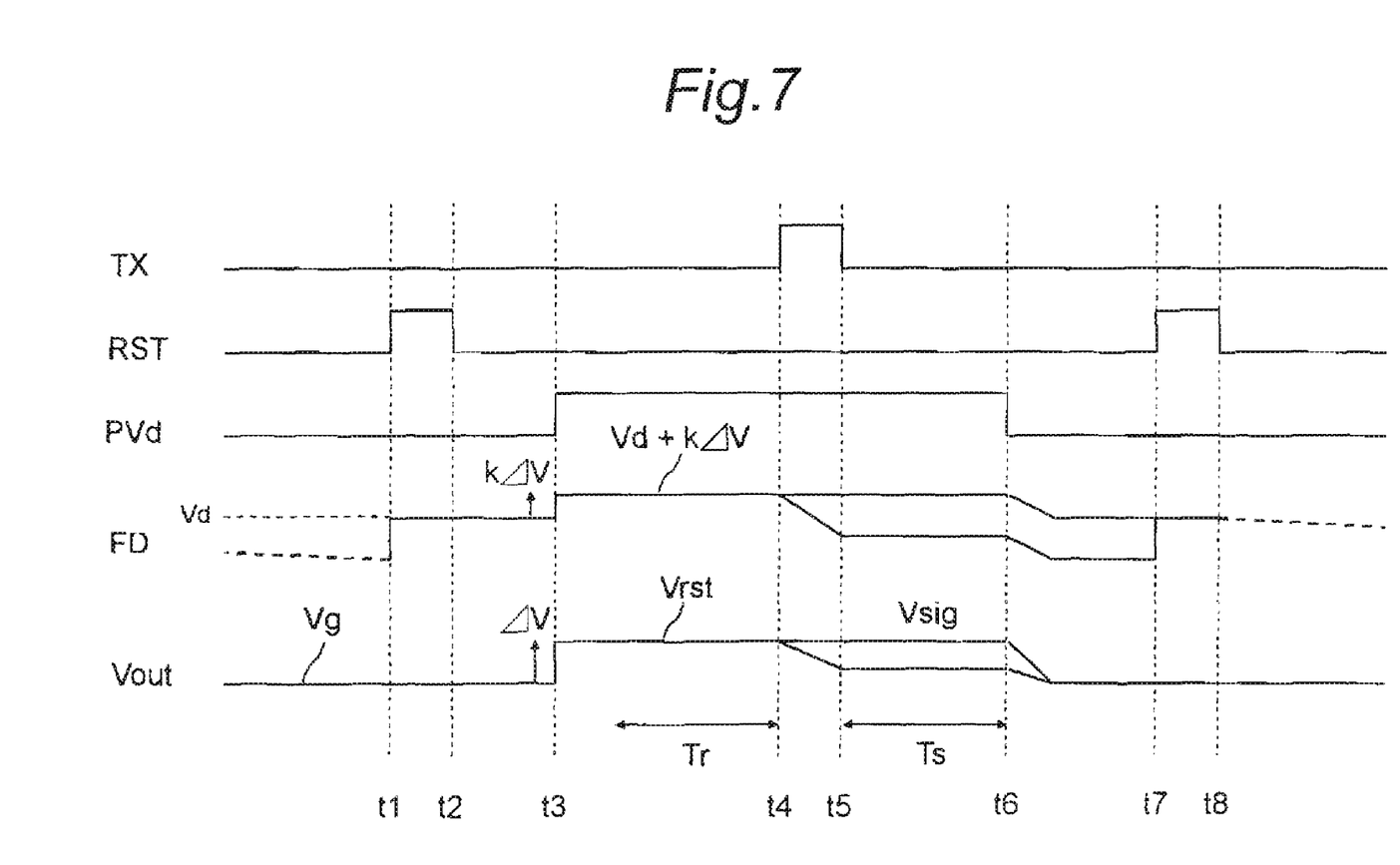
FIG. 7 is a timing chart of the amplification type solid-state imaging device according to a fourth embodiment of the invention of which the construction is shown in FIG. 6.

FIG. 6 shows a circuit diagram of the essential part of an amplification type solid-state imaging device according to the fourth embodiment of the invention, and FIG. 7 shows the timing of the amplification type solid-state imaging device.

A pixel part 50 of the amplification type solid-state imaging device of the fourth embodiment differs from that of FIG. 1 in that the select transistor 6 is absent and the drain side of the amplifying transistor 5 is connected to a drain signal line 25. In this case, by driving the operation waveform of the drain signal PVd of the drain signal line 25 by a scanning circuit 60 in accordance with the timing shown in FIG. 7, the drain side of the amplifying transistor 5 operates as in the case of FIG. 1 and FIG. 2. Therefore, an effect similar to that in the case of FIG. 1 and FIG. 2 of the first embodiment can be produced regardless of the absence of the select transistor 6.

Although the amplification type solid-state imaging device employing the embedded type photodiode 1 as one example of the photoelectric transducer has been described in the first through fourth embodiments, the photoelectric transducer is not limited to this.

Moreover, although the amplification type solid-state imaging device in which the plurality of pixel parts are arranged in a matrix form has been described in the first through fourth embodiments, the invention may be applied to an amplification type solid-state imaging device in which the pixel parts are arranged in one line in the direction of row or in the direction of column.

The invention claimed is:

1. An amplification type solid-state imaging device comprising:
    a pixel part having a photoelectric transducer, a transfer transistor to transfer a signal charge from the photoelectric transducer to a signal charge accumulating portion, a reset transistor to reset a voltage of the signal charge accumulating portion and an amplifying transistor whose source side is connected directly to a read signal line and amplifies and reads the voltage of the signal charge accumulating portion;
    a control section that controls the transfer transistor and the reset transistor and controls a drain side voltage of the amplifying transistor; and
    a select transistor inserted between a drain side of the amplifying transistor and a high voltage power source side, the select transistor being controlled by the control section,
    wherein the control section resets the voltage of the signal charge accumulating portion by turning on the reset transistor for a prescribed period in a state in which the voltage of the read signal line is retained at a first voltage by making the drain side voltage of the amplifying transistor have a low voltage out of a high voltage and the low voltage before a signal charge from the photoelectric transducer is transferred to the signal charge accumulating portion and thereafter making the drain side voltage of the amplifying transistor have the high voltage to make the read signal line have a second voltage higher than the first voltage, whereby the voltage of the signal charge accumulating portion becomes higher than a voltage immediately after resetting.

2. The amplification type solid-state imaging device as claimed in claim 1, wherein
    the drain side of the amplifying transistor is connected to a drain signal line, and
    a voltage of the drain signal line is controlled by the control section.

3. The amplification type solid-state imaging device as claimed in claim 1, wherein the control section makes the drain side of the amplifying transistor have the high voltage to make the read signal line have the second voltage and thereafter turns on the transfer transistor in order to transfer the signal charge from the photoelectric transducer to the signal charge accumulating portion.

4. The amplification type solid-state imaging device as claimed in claim 1, comprising:
    a load connected between the read signal line and a low voltage power source side.

5. The amplification type solid-state imaging device as claimed in claim 1, wherein the control section brings the select transistor into an off state when turning on the reset transistor to make the drain side of the amplifying transistor have the low voltage and to make the read signal line have the first voltage and thereafter turns on the select transistor to make the drain side of the amplifying transistor have the high voltage, thereby making the read signal line have the second voltage.

6. The amplification type solid-state imaging device as claimed in claim 2, wherein the control section makes the drain signal line have the low voltage out of the high voltage and the low voltage when turning on the reset transistor to make the read signal line have the first voltage and thereafter makes the drain signal line have the high voltage, thereby making the read signal line have the second voltage.

7. The amplification type solid-state imaging device as claimed in claim 1, wherein a capacitance element is inserted between the signal charge accumulating portion and the read signal line.

8. The amplification type solid-state imaging device as claimed in claim 1, wherein the reset transistor is a depletion type MOS type transistor.

9. The amplification type solid-state imaging device as claimed in claim 1, wherein the select transistor is a depletion type MOS type transistor.

10. The amplification type solid-state imaging device as claimed in claim 4, comprising:
    a switch transistor provided between the read signal line and the load.

11. The amplification type solid-state imaging device as claimed in claim 1, wherein the photoelectric transducer is an embedded type photodiode.

\* \* \* \* \*